(12) United States Patent
Ravi et al.

(10) Patent No.: US 12,033,085 B2
(45) Date of Patent: Jul. 9, 2024

(54) REPLICA RELIABILITY

(71) Applicant: Capital One Services, LLC, McLean, VA (US)

(72) Inventors: Vijayasuriya Ravi, Glen Allen, VA (US); Christina Garcia, Midlothian, VA (US); Raja Kavuru, Richmond, VA (US); Sathiyamurthy Thiruvengadathan, Glen Allen, VA (US); Lakshmi Ph Kommaraju, Glen Allen, VA (US); Mallikarjuna Rao Sambaraju, Glen Allen, VA (US); Nathan Robert Oster, Burke, VA (US); Philip Austin Kedy, Oakton, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/539,691

(22) Filed: Dec. 1, 2021

(65) Prior Publication Data
US 2023/0169355 A1 Jun. 1, 2023

(51) Int. Cl.
G06N 5/00 (2023.01)
G06N 5/02 (2023.01)
G06Q 20/20 (2012.01)

(52) U.S. Cl.
CPC .......... G06N 5/02 (2013.01); G06Q 20/202 (2013.01)

(58) Field of Classification Search
CPC ... G06N 5/02; G06F 16/275; G06F 16/24542; G06F 16/27
See application file for complete search history.

(56) References Cited

U.S. PATENT DOCUMENTS 8,019,727 B2 * 9/2011 Tomic ................. G06F 16/1844
707/614
8,229,808 B1 * 7/2012 Heit ........................ G06F 16/50
705/30

(Continued)

OTHER PUBLICATIONS

M. Noormohammadpour and C. S. Raghavendra. "Datacenter Traffic Control: Understanding Techniques and Trade-offs." IEEE Communications Surveys and Tutorials. Dec. 2017. pp. 1492-1525. vol. 20, No. 2. Located via Google Scholar, free copy available at https://arxiv.org/pdf/1712.03530.pdf.

(Continued)

*Primary Examiner* — Florian M Zeender
*Assistant Examiner* — Milena Racic
(74) *Attorney, Agent, or Firm* — Sterne, Kessler, Goldstein & Fox P.L.L.C.

(57) ABSTRACT

A system for processing and verifying real-time calculations in a cloud computing environment is disclosed. In embodiments, the system performs implements methods to receive, at a first data center, a request from a point of sale (POS) system to perform a real-time calculation, where the real-time calculation is used to make automated decisions about a transaction. The system can transmit the request to a decision handler. The decision handler can determine which of a plurality of decision engine queues to further transmit the request to. The decision handler can transmit the request to a decision engine queue from the plurality of decision engine queues. The decision engine queue can scatter the request to at least two decision engines. The decision engine queue can receive a result of the real-time calculation and transmit the results through other components to the POS system.

20 Claims, 4 Drawing Sheets

(56) References Cited

U.S. PATENT DOCUMENTS

| | | | | |
|---|---|---|---|---|
| 8,990,410 | B1* | 3/2015 | Damodaran | H04L 41/5003 709/224 |
| 9,323,672 | B2* | 4/2016 | Kim | G06F 12/08 |
| 10,048,996 | B1* | 8/2018 | Bell | G06F 11/3006 |
| 10,528,518 | B2* | 1/2020 | Graham | G06F 13/12 |
| 11,088,916 | B1* | 8/2021 | Chandrashekhar | H04L 41/122 |
| 11,381,456 | B2* | 7/2022 | Manzanilla | G06F 16/27 |
| 11,496,392 | B2* | 11/2022 | Agarwal | H04L 69/324 |
| 11,601,474 | B2* | 3/2023 | Vaidya | H04L 63/20 |
| 11,683,233 | B2* | 6/2023 | Rogozinsky | H04L 61/103 707/770 |
| 11,789,950 | B1* | 10/2023 | Bernier | G06F 16/24568 707/769 |
| 2004/0225587 | A1* | 11/2004 | Messmer | G06Q 40/00 705/35 |
| 2007/0208844 | A1* | 9/2007 | Armstrong | H04L 41/0896 709/223 |
| 2018/0167492 | A1* | 6/2018 | Bonig | G06F 9/546 |
| 2019/0013965 | A1* | 1/2019 | Sindhu | G06F 13/4282 |
| 2019/0349426 | A1* | 11/2019 | Smith | H04L 63/123 |
| 2020/0364718 | A1* | 11/2020 | Hindi | G06N 5/043 |
| 2021/0019209 | A1* | 1/2021 | Krishnaswamy | G06F 11/0772 |
| 2021/0036957 | A1* | 2/2021 | Kuang | H04L 43/0823 |
| 2022/0004337 | A1* | 1/2022 | Cariello | G06F 3/0679 |
| 2022/0237620 | A1* | 7/2022 | Saarenvirta | G06Q 20/4016 |
| 2022/0366494 | A1* | 11/2022 | Cella | G06Q 30/0201 |
| 2023/0020330 | A1* | 1/2023 | Schwerin | G06F 16/119 |
| 2023/0127037 | A1* | 4/2023 | Waite | G06F 9/45558 717/175 |

OTHER PUBLICATIONS

A. Charapko, A. Ailijiang, and M. Demirbas. "FleetDB: Follow-the-workload Data Migration for Globe-Spanning Databases." Technical Report. 2018. Located via Google Scholar, free copy available at https://cse.buffalo.edu/tech-reports/2018-02.pdf.

W. Cirne, D. Paranhos, F. Brasileiro, L. Goes, and W. Voorsluys. "On the Efficacy, Efficiency and Emergent Behavior of Task Replication in Large Distributed Systems." In Parallel Computing. 2007. Located via Google Scholar, free copy available at https://citeseerx.ist.psu.edu/viewdoc/download?doi=10.1.1.69.347&rep=rep1&type=pdf.

D. Poola, K. Ramamohanarao, and R. Buyya. "Enhancing Reliability of Workflow Execution Using Task Replication and Spot Instances." ACM Transactions on Autonomous and Adaptive Systems (TAAS). Feb. 2016. pp. 1-21. vol. 10, No. 4, Article No. 30, ISSN: 1556-4665. ACM Press. New York, USA. DOI: http://dx.doi.org/10.1145/2815624. Located via Google Scholar, free copy available at http://gridbus.csse.unimelb.edu.au/papers/TaskDuplicationTASS.pdf.

M. Eischer and T. Distler. "Resilient Cloud-based Replication with Low Latency." Proceedings of the 21st International Middleware Conference. 2020. pp. 14-28. Located via Google Scholar, free copy available at https://arxiv.org/pdf/2009.10043.pdf.

* cited by examiner

FIG. 1 (Conventional System)

REPLICA RELIABILITY

TECHNICAL FIELD

Embodiments relate to systems and methods for increasing reliability of real-time calculations using a cloud computing environment, specifically real-time calculations used to make automated decisions about a transaction.

BACKGROUND

Processing and verifying real-time transactions is vitally important to companies, in particular to financial service companies which process millions of dollars worth of transactions for merchants every second. The transactions can be related to, for example, real-time payment transactions of customers trying to purchase goods from a merchant. The processing to be performed can result in, for example, verifying whether to authorize or deny the purchase, perform fraud detection, etc. This processing and verification is time sensitive, must be done accurately, and must be done almost instantaneously from when customers attempt to make payments. Any delays in the processing and verification typically leads to inconveniences for both customers and merchants. Financial service companies can also lose good will from merchants if such inconveniences lead to loss of business.

Traditional ways in which processing and verification is done is by transmitting customer payment information from point of sale (POS) systems via interfaces (e.g., debit/credit card readers, cash registers, mobile devices, barcode/QR code readers, websites, etc.) through a payment processing network, and ultimately to a financial service company's backend systems. The backend systems are typically located in a single data center. The data center houses servers containing software and/or hardware that serve as decision/calculation engines. The decision engines perform calculations to verify the transactions. The calculations lead to automated determinations whether or not to allow the transactions to proceed.

One downside to this approach is that because the approach focuses on the single data center paradigm, each individual component must be optimized to prevent its failure, because a failure of any one component can be catastrophic, particularly in instances where large amounts of transactions (involving millions of dollars) are being processed every second. However, it is impossible to design a system to be fail proof because systems inevitably fail.

Thus, more robust processing and verification systems are needed to account for instances where failures occur, and to maintain real-time processing and verification capabilities during these failures. Moreover, such systems need to ensure a high degree of accuracy in the calculations they perform. Thus, systems and methods are needed to address the aforementioned problems.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
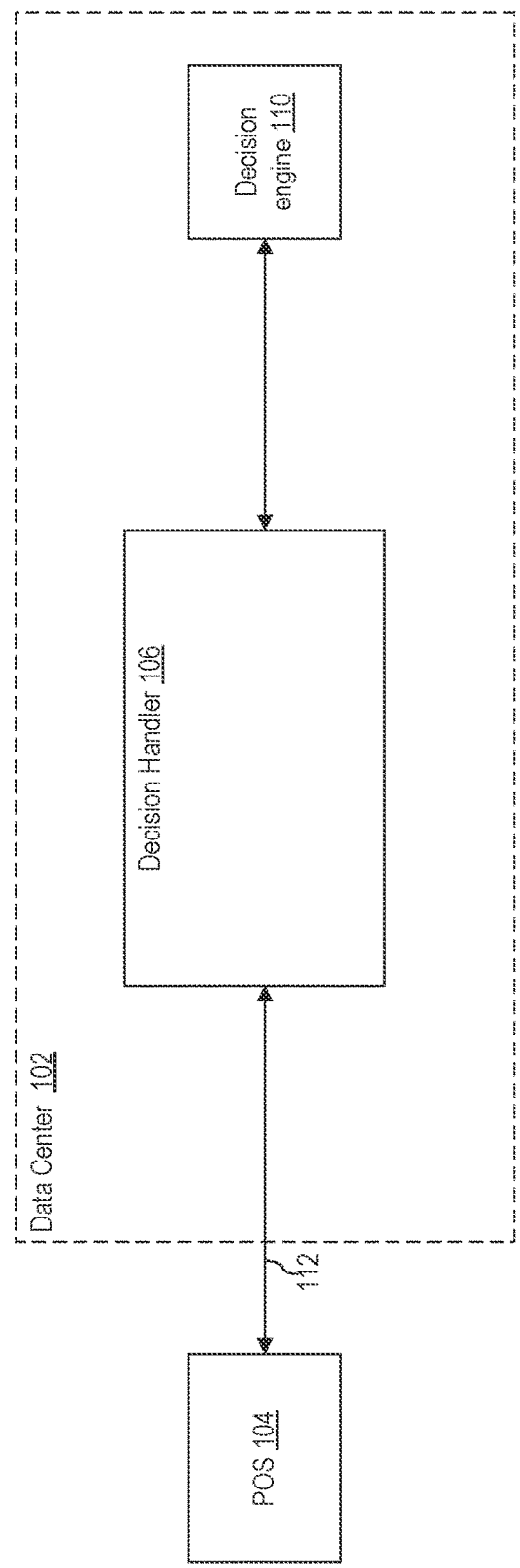
FIG. 1 is a conventional system for processing and verifying real-time calculations for transactions, for example financial transactions.

Embodiments disclosed herein provide an improved system and methods for processing and verifying real-time calculations for transactions, using a cloud computing environment. The system and methods improve conventional systems by utilizing architectures and components of a cloud computing environment to provide a more robust architecture for processing and verifying calculations. In embodiments, the calculations can be, for example, to process and verify financial transactions such as real-time purchases being made by customers. The system achieves its improvements by implementing methods to scatter transaction information received from a POS system across multiple data centers, each performing the same calculations in parallel to perform the processing and verification. This creates a race condition between the various data centers to perform the processing and verification. This also ensures that failure of any one component or data center does not cascade and disrupt the system's overall ability to perform the processing and verification. In embodiments, once a decision is made regarding the transaction, for example, whether the transaction is allowed to proceed or not, the results obtained from the first decision engine to generate the result is sent back to the POS system to be relayed back to, for example, a merchant and/or customer. In embodiments, other results received from other decision engines are discarded.

In embodiments, the system can perform the aforementioned functionality by implementing methods to receive, at a first data center, a request from a POS system to perform a real-time calculation, where the real-time calculation is used to make automated decisions about a transaction. In embodiments, the system can transmit the request to a decision handler. In embodiments, the decision handler can determine which of a plurality of decision engine queues to further transmit the request to. In embodiments, the decision handler can transmit the request to a decision engine queue from the plurality of decision engine queues. In embodiments, the decision engine queue can scatter the request to at least two decision engines where the at least two decision engines perform the real-time calculation in parallel, and where a first decision engine from the at least two decision engines is in the first data center and a second decision engine from the at least two decision engines is in a second data center. In embodiments, the decision engine queue can receive a result of the real-time calculation from a decision engine from the at least two decision engines. In embodiments, the decision engine queue can transmit the result to the decision handler. In embodiments, the decision handler can transmit the result back to the POS system.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an embodiment of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 shows a conventional system 100 for processing and verifying real-time calculations for transactions. For the purposes of FIG. 1, the transactions discussed will be financial transactions processed by a company or institution. In instances, the company or institution can be a financial service company such as a bank, credit union, investment broker, etc. An example of financial transactions includes a payment made by customers to a merchant for goods or services purchased. The examples with respect to financial transactions are exemplary. Other transactions, such as fraud detection, credit checks, etc. can be processed in a similar manner using system 100.

With respect to FIG. 1, when considering a financial transaction, system 100 typically has an architecture including a point of sale (POS) system 104, which provides system 100 with its inputs. In the case of a financial transaction, the inputs can be, for example, a real-time payment transaction and information associated therewith, that is transmitted by the POS system 104 via a network 112 to a data center 102 of the company or institution.

The network 112 can refer to a telecommunications network, and may span and represent a variety of networks and network topologies. For example, the network 112 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 112. Cable, Ethernet, digital subscriber line (DSL), fiber optic lines, fiber to the home (FTTH), and plain old telephone service (POTS) are examples of wired communication that may be included in the network 112. Further, the network 112 may traverse a number of network topologies and distances. For example, the network 112 may include direct connection, personal area network (PAN), local area network (LAN), metropolitan area network (MAN), wide area network (WAN), or a combination thereof.

The data center 102 can refer to a building, dedicated space within a building, or a group of buildings used to house computer systems and associated components, such as telecommunications and storage systems. In instances, the data center 102 can include several components including, for example, a decision handler 106 and a decision engine 110. In instances, the decision engine 110 can process and verify the transaction. The decision engine 110 can perform the processing and verification functions by, for example, performing real-time calculations. Real-time refers to the calculations being performed near instantaneously from when they are received from the POS system 104. Typical constrains on the time to perform the real-time calculations is that the real-time calculations are performed within 250 milliseconds from when a request is received by system 100 from the POS system 104 to process and verify the transaction. This time constraints, however, are merely examples and other time constraints are contemplated so long as the delay for receiving a decision is minimal.

In instances, the calculations can, for example, be based on business rules, algorithms, models, etc., implemented using software and/or hardware, that when executed will result in a decision regarding the financial transaction. The decision can be, for example, either allowing the transaction to proceed or denying the transaction. For example, an instance in which the transaction is denied could be because the calculations determine there is a high probability the transaction is fraudulent. This can be done based on a variety of factors and input variables used to perform the calculations indicating that the transaction is not typical of the type of transaction made by a customer.

The POS system 104 can refer to a system or systems that can receive information related to the transaction, and which can provide that information to the company or institution to process and verify. For example, the POS system 104 can include devices and modules that enable receipt of transaction information and transmit the transaction information to the data center 102. Example devices and modules can include debit/credit card readers, cash registers, mobile devices, barcode/QR code readers, website wallets, or payment platforms, etc. The customer can be, for example, any person making a purchase from a merchant. For example, in instances where the customer attempts to make a purchase from a merchant using a credit/debit card, the POS system 104 can receive the credit/debit card information via a credit/debit card reader, and transmit the credit/debit card information via the network 112 to the company or institution's data center 102 to process and verify. In instances, the POS system 104 can additionally transmit further information regarding the transaction, such as the amount being transacted, from what location the transaction is taking place, from what merchant, the type of goods or services that are the subject of the transaction, etc.

In instances, the data center 102 can be part of a backend computing infrastructure, including a server infrastructure of the company or institution. In instances, the server infrastructure can include servers, computers, software, or a combination thereof housed in the data center 102. In instances, the servers, computers, software, or a combination thereof housed in the data center 102 can include special purpose servers and computers, software, or a combination thereof, dedicated to performing the processing and verification. In instances, these can include the decision handler 106 and the decision engine 110.

The decision handler 106 refers to a module or unit that can receive information coming into the data center 102 from external sources. In instances, the decision handler 106 can receive the information directly or via other components of the data center 102. In instances, these other components can serve a gatekeeper role for the data center 102. In instances, these other components can include, for example, firewalls, gateways, etc. Taking the example of a financial transaction received from the POS system 104, in instances, the transaction information transmitted by the POS system 104 can be received by the decision handler 106. In instances, other systems, different from the POS system 102, can also transmit information to the data center 102. These can include fraud detection systems, credit monitoring systems, etc. These systems can also transmit information to the data center 102 that can be received by the decision handler 106.

Continuing with the example, in instances, once the decision handler 106 receives information, the decision handler 106 can determine where to route the received information within the data center 102 so that it can be processed and verified. In instances, the decision handler 106 can route the information based on further information accompanying the transaction information. In instances, this can include, for example, packet level information identifying the information as being related to, for example, a financial transaction. In instances, the information can be in the form of headers, metadata, etc., accompanying the information received, which can also be provided by the external system, for example the POS system 104, identifying the information as being related to, for example, a financial transaction. In instances, the decision handler 106, based on the further information, can route the received information to further components of the data center 102 to be processed and verified.

In instances, the further components can also include the decision engine 110. The decision engine 110 refers to a module or unit that can perform the calculations to process and verify the transaction. In instances, the calculations can allow the company or institution to make automated decisions to, for example, allow or deny the transaction. For example, and taking the instance where a customer is attempting to make a purchase from a merchant, the calculation to be performed can result in a value, based on which the company or institution can determine whether to allow or deny the purchase. In instances, the decision engine 110 can perform the calculations by executing business rules, algorithms, or computations, etc. to determine whether the transaction should be allowed or not allowed. In instances, these calculations can generate results, for example, probabilities, absolute values, etc., indicating, for example, the level of risk associated with the transaction, based on which the company or institution can determine whether to deny or approve the transaction. In instances, the calculations can take into account variables such as whether the transaction is within the normal purchasing behavior of the customer, whether there is any unusual characteristic about the transaction, for example it is being initiated from a geographic location where the customer does not typically transact from, is for monetary amounts exceeding the typical spend for a customer, etc. In instances, based on the results of the calculations, an automated determination can be made whether the transaction should be allowed or denied.

In instances, once the calculations are performed, and the results are obtained, the company or institution can determine whether to allow or deny the transaction, and send the results back through the decision handler 106 to the POS system 104, which can communicate that decision to the merchant and/or the customer.

The aforementioned system 100 has limitations. Most notably, it focuses on a single data center paradigm. Thus, failure of any one component in the flow of operations will result in cascading failures downstream. This is problematic, and can result in significant delays or downtime if a component fails. This is particularly problematic when large numbers of transactions are being processed, which could potentially cost the company, institution, or merchant revenue.

Figure 2:
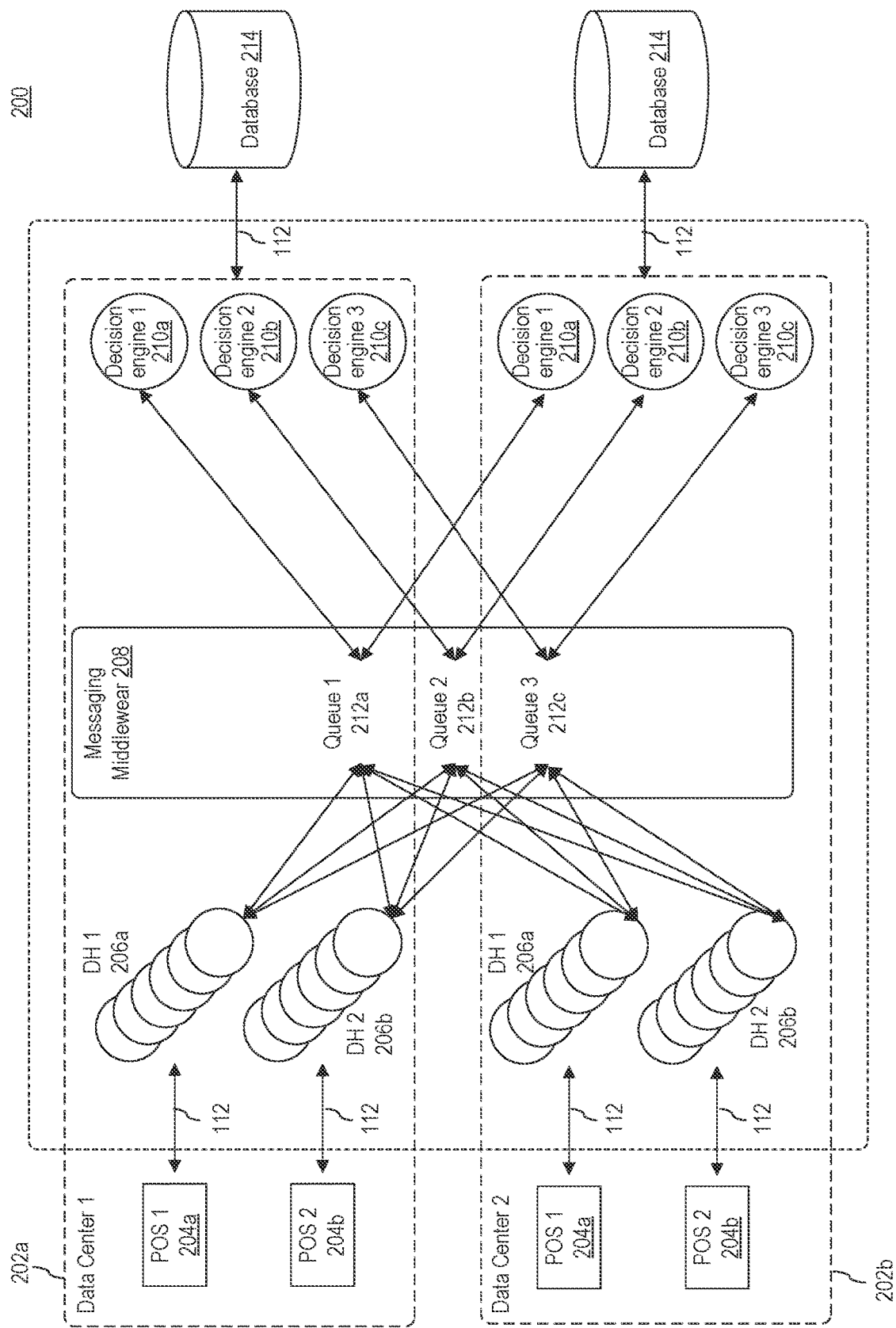
FIG. 2 is an improved system for processing and verifying real-time calculations for transactions using a cloud computing environment in an embodiment of the present disclosure.

FIG. 2 shows an improved system 200 for processing and verifying real-time calculations for transactions using a cloud computing environment in an embodiment of the present disclosure. System 200 provides a more robust architecture than system 100 for processing and verifying real-time calculations. In embodiments, system 200's architecture is set up to utilize multiple data centers 202 to perform the processing and verification functions. The data centers 202 are shown in FIG. 2 as {202a, 202b}. The data centers 202 can be similar to data center 102 and have similar components, including decision handlers 206 and decision engines 210. The decision handlers 206 are shown in FIG. 2 as {206a, 206b}. The decision engines are shown in FIG. 2 as {210a, 210b, 210c}. In embodiments, the decision handlers 206 and the decision engines 210 can be set up and dedicated to handling certain inputs and/or decisions that are to be made. For example, in embodiments, decision handler 206a can be dedicated to taking inputs in from one system, for example POS system 204a, while decision handler 206b can be dedicated to taking inputs in from another system, for example POS system 204b. Similarly, in embodiments, the decision engines 210 can be dedicated to performing certain specific calculations. For example, in embodiments, decision engine 210a can be dedicated to performing calculations to allow or deny a transaction, while decision engine 210b can be dedicated to performing calculations to perform fraud detection or credit monitoring. The aforementioned are merely exemplary.

With respect to FIG. 2, while only two data centers 202 are shown, this is for ease of description. In embodiments, any number of data centers 202 can be used to implement system 200. Thus, system 200 provides a robust architecture, which can be scaled to any number of data centers 202. In embodiments, however, the minimum number of data centers 202 should be equal to two. In embodiments, system 200 should also have at least two of the data centers 202 be in different geographic locations. By having at least two data centers 202 in different geographic locations, system 200 can maintain its reliability and continued operation if one of the data centers 202 goes off line for any reason.

In embodiments, system 200 can be implemented in a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud environment similar to a public cloud with the exception that it is operated solely for a single organization.

In embodiments, system 200, because it can be implemented in a cloud computing environment, can leverage cloud computing resources and services to assist in the processing and verifying functions. In embodiments, one such cloud computing service is a messaging middlewear 208 that can be utilized to coordinate messaging amongst the data centers 202 and/or decision engines 210. For example, in embodiments, the messaging middlewear 208 can support and coordinate messaging between data centers 202 and/or decision engines 210 in different data centers 202, in order to transmit the information received from the POS systems 204 to each of the data centers 202 and/or decision engines 210.

In embodiments, the messaging middlewear 208 implemented can be based on the Neural Autonomic Transport System (NATS) open source messaging system developed by Synadia Communications, Inc. In embodiments, the messaging middlewear 208 can enable the exchange of data that is segmented into messages among computer applications and services. For example, in embodiments, the messaging middlewear 208 can serve as a messaging system to provide the transaction information received from the POS systems 204 by the decision handlers 206, and route the transaction information to the decision engines 210. In embodiments, the messaging middlewear 208 can have a copy of its code and/or functionality stored or implemented in each of the data centers 202, or can connect to each of the data centers 202 via the network 112, so as to be able to handle the coordination of messaging between data centers 202 and/or decision engines 210.

In embodiments, the messaging middlewear 208 can be coupled to each of the decision handlers 206. In embodiments, the coupling can be via an API, by which the decision handlers 206 can transmit the information received from external sources, such as the POS systems 204, to the messaging middlewear 208. In embodiments, the messaging middlewear 208 can include a plurality of decision engine queues 212, which can couple to the decision handlers 206 via the API to receive the information from the decision handlers 206. The decision engine queues 212 refer to data structures in which a collection of data that is maintained in a sequence can be modified by the addition of data at one end and the sequence and removal of data from the other end of the sequence.

In embodiments, the decision engine queues 212 can be implemented such that they are able to receive a certain type of information from each of the decision handlers 206, and can further transmit the certain type of information to the decision engines 210 dedicated to processing that type of information. For example, in embodiments, certain decision engine queues 212 can be implemented to only receive financial information regarding financial transactions (e.g., decision engine queue 212a), while other decision engine queues 212 can be implemented to receive information regarding fraud detection (e.g., decision engine queue 212b), from a fraud detection system, etc. In embodiments, the decision engine queues 212 can further be coupled to the decision engines 210. In embodiments, the coupling can be via an API. In embodiments, the decision engine queues 212 can further transmit via the API the certain type of information to the decision engines 210 to be processed by the decision engines 210 dedicated to processing that type of information. In FIG. 2, the decision engine queues 212 are shown as {212a, 212b, 212c}.

In embodiments, the messaging middlewear 208 can implement a scattering by which the messaging middlewear 208, via the decision engine queues 212, can determine what decision engines 210 to transmit the information in each of the decision engine queues 212 to, and scatter the information to those decision engines 210. Scattering refers to a process by which the information in each of the decision engine queues 212 is transmitted simultaneously (i.e., broadcast) to multiple decision engines 210 meant to process that information. In embodiments, the scattering can be based on a Scatter-Gather algorithm. Scatter-Gather algorithm refers to a class of algorithms that broadcast a message to multiple recipients and re-aggregates the response back into a single message. Scatter-Gather algorithms are known to those skilled in the art and the specifics of such classes of algorithms will not be discussed in further detail in this disclosure. In embodiments, the messaging middlewear 208 can implement a Scatter-Gather algorithm to route a request message to the number of recipients and then use an aggregator to collect the responses and distills them into a single response message. In the example of a financial transaction, the messaging middlewear 208 can have the Scatter-Gather algorithm determine which of the decision engine queues 212 is holding the financial transaction information and then scatter (i.e. broadcast) that information to the appropriate decision engines 210, via the decision engine queues 212, so that the decision engines 210 can process and verify that information in parallel, to make a determination whether to allow or deny the transaction.

In embodiments, the scattering can be based on predetermined rules. For example, in embodiments, the decision engine queues 212 can have predetermined rules dictate where the decision engine queues 212 can scatter the information in their queues to. For example, these rules can determine which decision engines 210 and in which data centers 202 the information in each of the decision engine queues 212 is to be scattered to. For example, in embodiments, the rules can be based on which data centers 202 are available, which decision engines 210 are available, etc. Availability refers to the ability of the data centers 202 and/or decision engines 210 to process the information scattered by the decision engine queues 212 (i.e., they are online to receive, process, and verify the information). Thus, in this way, the scattering can be done efficiently and dynamically such that information is only scattered to data centers 202 and decision engines 210 that are able to process that information and not to those data centers 202 or decision engines 210 that are offline and which cannot process the information.

In embodiments, the predetermined rules can also determine which decision engines 210 have excess capacity compute resources, and have the decision engine queues 212 prioritize scattering information to those decision engines 210 that are determined to have excess capacity compute resources. The determination of whether decision engines 210 have excess capacity compute resources can be based on a monitoring done by the messaging middlewear 208 based on feedback and updates regarding the compute resources provided by each of the decision engines 210 to the messaging middlewear 208. Excess capacity compute resources refers to excess processing resources of the decision engines 210 that can be used to process and verify the information. The excess processing resources can account for processors, storage, etc. that are idle, have more bandwidth to process or store information, etc. to perform the calculations needed to process and verify the information. In this way, idle compute resources can be utilized to perform the processing information. This results in system 200 being highly resource efficient, in that it can perform processing and verification functions using existing compute resources. In this way, rather than adding compute resources, system 200 can utilize existing hardware, processors, and storage to perform its functions. This is beneficial because rather than adding new hardware to perform calculations, existing hardware can be used which can lower costs as system 200 scales, while maintaining the same performance when processing and verifying the information.

In embodiments, once the scattering is performed to the decision engines 210, the decision engines 210 can perform the calculations needed to perform the processing and verification. In embodiments, because scattering is done to broadcast the information to the decision engines 210 simultaneously and in parallel, a race condition is created by which every decision engine 210 that has information broadcast to it begins to perform the calculations necessary to process and verify the information. In embodiments, the decision engines 210 may utilize external systems or resources to perform the calculations. In embodiments, these can include a database 214 that stores the algorithms, variables, conditions, data, rules, etc. used by the decision engines 210 to perform the calculations. In embodiments, the database 214 can be, for example, Hazelcast IMDG, which is an open source in-memory data grid of the Hazelcast company, or Dynamo DB, which is a fully managed proprietary NoSQL database service offered by Amazon.com. Other cloud and non-cloud based databases can also be used.

In embodiments, once the decision engines 210 perform the calculations to process and verify the information individually, a result can be obtained by each of the decision engines 210. The process is similar to what was described with respect to FIG. 1, with the exception that the results of each of the decision engines 210 can transmit its result back to the messaging middlewear 208, and in particular to the decision engine queues 212. In embodiments, this re-aggregation can be done using an aggregator functionality of the Scatter-Gather algorithm. In embodiments, the results of each of the decision engines 210 can be transmitted to the messaging middlewear 208 and/or decision engine queues 212 by the decisions engines 210 as soon as they are determined.

In embodiments, once the messaging middlewear 208 and/or the decision engine queues 212 receives the first result of the real-time calculation from any one of the decision engines 210, the messaging middlewear 208 can transmit the result to any one of the decision handlers 206 which initially transmitted the transaction information to the messaging middlewear 208 and/or the decision engine queues 212 for processing and verification. In embodiments, once received by the decision handlers 206 the result can be further transmitted, by the decision handlers 206, to the POS systems 204 which can further transmit the result to the merchant and/or the customer indicating whether the transaction has been allowed or denied.

In embodiments, once the messaging middlewear 208 and/or the decision engine queues 212 receives the first result of the real-time calculation from any one of the decision engines 210, the messaging middlewear 208 can discard any subsequent results of the real-time calculations received from other decision engines 210 performing the same calculations. In this way, only one result can be sent back to the POS systems 104 and potentially conflicting messages won't be received by the POS systems 204.

It has been discovered that the system 200 described above significantly improves the state of the art from previous conventional systems that perform processing and verification of transactions, because it introduces a novel cloud based architecture for processing and verifying real-time calculations using a cloud computing environment. The architecture of system 200 implements a novel scattering process not previously used to process and verify transactions. The use of the scattering processes novelty stems from its ability to utilize the cloud computing environment to create a race condition among decision engines 210 to perform the calculations needed to process and verify the transaction. The use of scattering in this manner is novel because similar scattering processes (e.g., Scatter-Gather algorithms) have only been used to break down computations into smaller pieces, each to be computed individually, each piece of which is then re-aggregated to integrate the results of its computation in a larger result. System 200, however uses scattering in a different way, which is to create a race condition such that calculations performed to process and verify transactions are done individually but not re-aggregated. Thus, system 200 pits the decision engines 210 against one another to see which can obtain the results the fastest. The fastest decision engine among the decision engines 210 to generate a result has its results then used by system 200 to process and verify the transaction. As a result, processing and verification is performed much faster than conventional systems.

It has been further discovered that system 200 performs processing and verification calculations much more accurately than conventional systems using the architecture of FIG. 1 within the same timeframes. This is due to its ability to have multiple data centers 202 and/or decision engines 210 process the same information simultaneously and in parallel. This parallel processing results in more accurate results because no one component can bottleneck system 200, and faults in any one component are less likely to cascade to other components. Thus, system 200 uses a "wisdom of crowds" approach that generates results that are more accurate within the same timeframes than conventional systems. For example, it has been discovered, based on tests performed on system 200, that system 200 achieves 99.990% accuracy for computations done within 250 milliseconds, 99.996% accuracy for computations done within 300 milliseconds, 99.998% accuracy for computations done within 350 milliseconds, and 99.998% accuracy for computations done within 500 milliseconds. Conventional systems, such as systems using the architecture of system 100, only achieve 97.962% to 99.426% accuracy for computations done within 250 milliseconds, 98.548% to 99.590% accuracy for computations done within 300 milliseconds, and 98.792% to 99.660% accuracy for computations done within 350 milliseconds.

It has been further discovered that system 200 performs processing and verification calculations in a much more resource efficient manner than conventional systems. This is because it can scatter information to decision engines 210 based on a determination of which data venters 202 and/or decision engines 210 are available and which decision engines 210 have excess compute resources to process and verify the information. In this way, information can be scattered only to available components. Moreover, information can be scattered to those decision engines 210 that have excess capacity to process that information, thus utilizing idle compute resources that would otherwise go unused. This has the effect of lowering IT costs and allowing system 200 to scale more cost effectively, because rather than add hardware to the system, system 200 can use existing hardware in a more efficient manner to process increasing amounts of information.

The modules and services described with respect to FIG. 2 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 200 or installed as a removable portion of the system 200.

Methods of Operation

Figure 3:
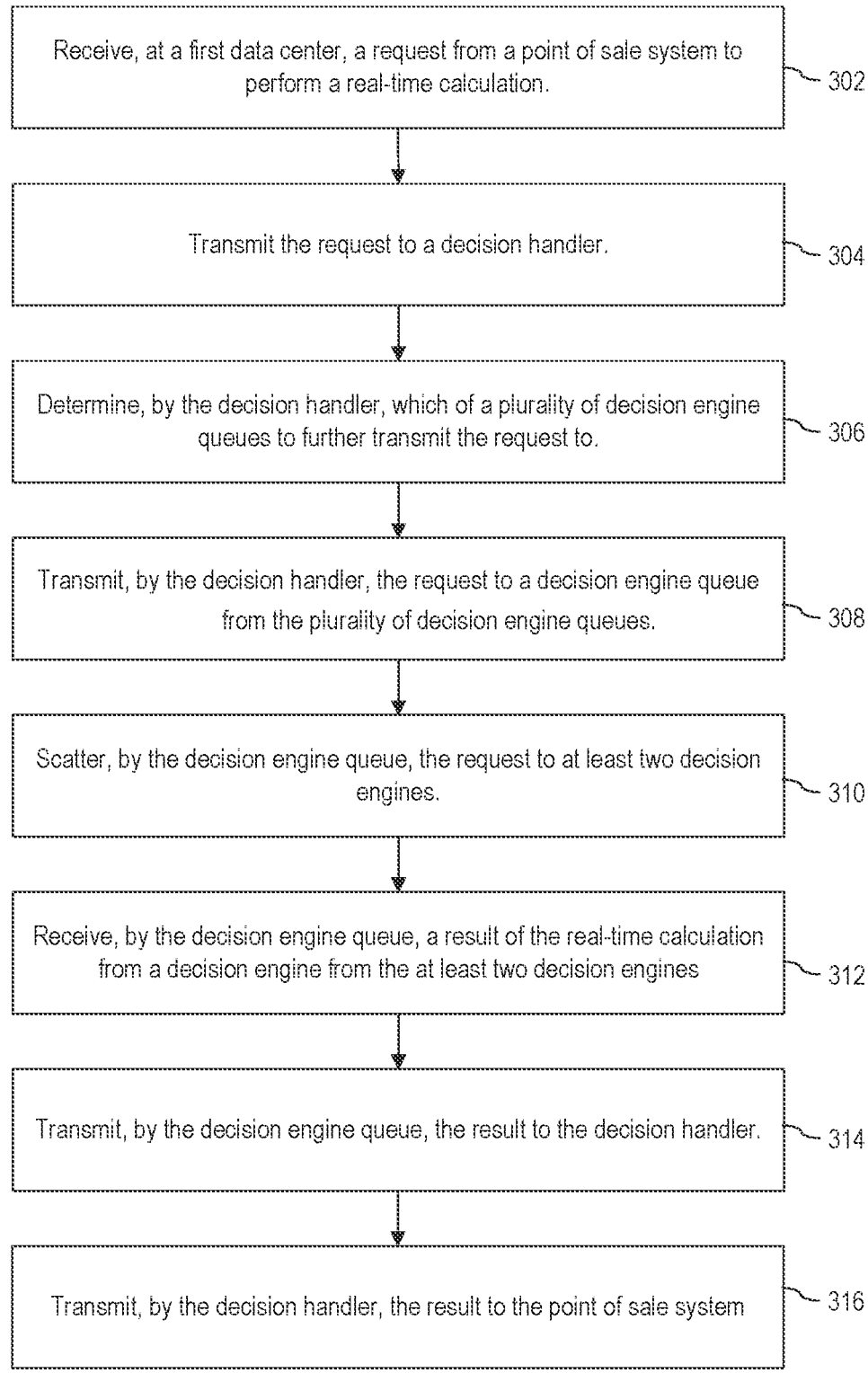
FIG. 3 is an example method of operating the improved system in an embodiment of the present disclosure.

FIG. 3 shows an example method 300 of operating system 200 in an embodiment of the present disclosure. In embodiments, method 300 may be performed by utilizing one or more computing devices, modules, units, or services of a cloud computing environment to perform method 300. In embodiments, method 300 can have one or more computing devices receive, at a first data center (e.g., 202a), a request from a point of sale system (e.g., 204a) to perform a real-time calculation, where the real-time calculation is used to make automated decisions about a transaction, as shown in 302.

In embodiments, method 300 can have one or more computing devices transmit the request to a decision handler (e.g., 206a), as shown in 304.

In embodiments, the decision handler 206a, can determine which of a plurality of decision engine queues (e.g., 212a, 212b, 212c) to further transmit the request to, as shown in 306. In embodiments, the determination can be based on predetermined rules indicating which data centers 202 and/or decision engines 210 are available. In embodiments, the predetermined rules can also be based on which decision engines 210 have excess compute resources available to perform the calculations.

In embodiments, the decision handler 206a can transmit the request to a decision engine queue (e.g., 212a) from the plurality of decision engine queues (212a, 212b, 212c), as shown in 308.

In embodiments, the decision engine queue 212a can scatter the request to at least two decision engines (e.g., any pair of 210a, 210b, or 210c), where the at least two decision engines (any pair of 210a, 210b, or 210c) can perform the real-time calculation in parallel, and where a first decision engine (e.g., a first instance of 210a in data center 202a) from the at least two decision engines is in the first data center (e.g., 202a) and a second decision engine (e.g., a second instance of 210a in data center 202b) from the at least two decision engines is in a second data center (e.g., 202b), as shown in 310. In embodiments, the scattering can be performed using a Scatter-Gather algorithm.

In embodiments, the decision engine queue 212a can receive a result of the real-time calculation from a decision engine (e.g., 210a) from the at least two decision engines, as shown in 312.

In embodiments, the decision engine queue 212a can transmit the result to the decision handler 206a, as shown in 314.

In embodiments, the decision handler 206a can transmit the result to the POS system 204a, as shown in 316.

The operations of method 300 is performed, for example, by system 200, in accordance with embodiments described above.

Components of the System

Figure 4:
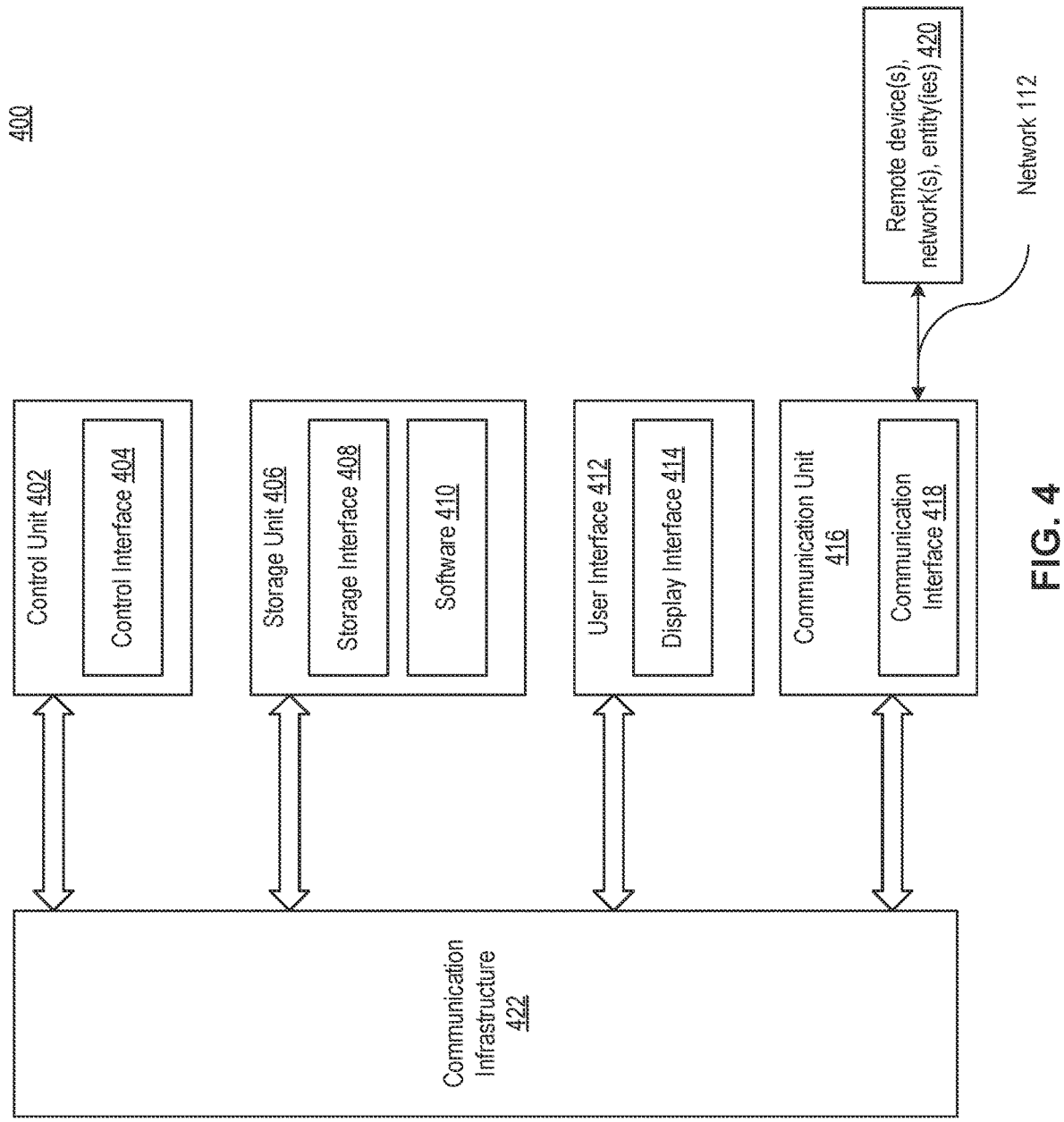
FIG. 4 is an example architecture of the components implementing the system in an embodiment of the present disclosure.

FIG. 4 shows an example architecture 400 of the components implementing system 200 in an embodiment of the present disclosure. In embodiments, the components may be a part of any of the servers, computers, etc. of the data centers 202 and/or database 214. In embodiments, the components can include a control unit 402, a storage unit 406, a communication unit 416, and a user interface 412. The control unit 402 may include a control interface 404. The control unit 402 may execute a software 410 to provide some or all of the intelligence of system 200. The control unit 402 may be implemented in a number of different ways. For example, the control unit 402 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 404 may be used for communication between the control unit 402 and other functional units or devices of system 200. The control interface 404 may also be used for communication that is external to the functional units or devices of system 200. The control interface 404 may receive information from the functional units or devices of system 200, or from remote devices 420, or may transmit information to the functional units or devices of system 200, or to remote devices 420. The remote devices 420 refer to units or devices external to system 200.

The control interface 404 may be implemented in different ways and may include different implementations depending on which functional units or devices of system 200 or remote devices 420 are being interfaced with the control unit 402. For example, the control interface 404 may be implemented with optical circuitry, waveguides, wireless circuitry, wireline circuitry to attach to a bus, an application programming interface, or a combination thereof. The control interface 404 may be connected to a communication infrastructure 422, such as a bus, to interface with the functional units or devices of system 200 or remote devices 420.

The storage unit 406 may store the software 410. For illustrative purposes, the storage unit 406 is shown as a single element, although it is understood that the storage unit 406 may be a distribution of storage elements. Also for illustrative purposes, the storage unit 406 is shown as a single hierarchy storage system, although it is understood that the storage unit 406 may be in a different configuration. For example, the storage unit 406 may be formed with different storage technologies forming a memory hierarchical system including different levels of caching, main memory, rotating media, or off-line storage. The storage unit 406 may be a volatile memory, a nonvolatile memory, an internal memory, an external memory, or a combination thereof. For example, the storage unit 406 may be a nonvolatile storage such as nonvolatile random access memory (NVRAM), Flash memory, disk storage, or a volatile storage such as static random access memory (SRAM) or dynamic random access memory (DRAM).

The storage unit 406 may include a storage interface 408. The storage interface 408 may be used for communication between the storage unit 406 and other functional units or devices of system 200. The storage interface 408 may also be used for communication that is external to system 200. The storage interface 408 may receive information from the other functional units or devices of system 200 or from remote devices 420, or may transmit information to the other functional units or devices of system 200 or to remote devices 420. The storage interface 408 may include different implementations depending on which functional units or devices of system 200 or remote devices 420 are being interfaced with the storage unit 406. The storage interface 408 may be implemented with technologies and techniques similar to the implementation of the control interface 404.

The communication unit 416 may allow communication to devices, components, modules, or units of system 200 or to remote devices 420. For example, the communication unit 416 may permit the system 200 to communicate between its components such as the decision handlers 206, the messaging middlewear 208, the decision engines 210, and/or the database 214. The communication unit 416 may further permit the devices of system 200 to communicate with remote devices 420 such as an attachment, a peripheral device, or a combination thereof through a network 112, such as a wireless or wired network.

The network 112 may span and represent a variety of networks and network topologies. For example, the network 112 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 112. Cable, Ethernet, digital subscriber line (DSL), fiber optic lines, fiber to the home (FTTH), and plain old telephone service (POTS) are examples of wired communication that may be included in the network 112. Further, the network 112 may traverse a number of network topologies and distances. For example, the network 112 may include direct connection, personal area network (PAN), local area network (LAN), metropolitan area network (MAN), wide area network (WAN), or a combination thereof.

The communication unit 416 may also function as a communication hub allowing system 200 to function as part of the network 112 and not be limited to be an end point or terminal unit to the network 112. The communication unit 416 may include active and passive components, such as microelectronics or an antenna, for interaction with the network 112.

The communication unit 416 may include a communication interface 418. The communication interface 418 may be used for communication between the communication unit 416 and other functional units or devices of system 200 or to remote devices 420. The communication interface 418 may receive information from the other functional units or devices of system 200, or from remote devices 420, or may transmit information to the other functional units or devices of the system 100 or to remote devices 420. The communication interface 418 may include different implementations depending on which functional units or devices are being interfaced with the communication unit 416. The communication interface 418 may be implemented with technologies and techniques similar to the implementation of the control interface 404.

The user interface 412 may present information generated by system 200. In embodiments, the user interface 412 allows a user of system 200 to interface with the devices of system 200 or remote devices 420. The user interface 412 may include an input device and an output device. Examples of the input device of the user interface 412 may include a keypad, buttons, switches, touchpads, soft-keys, a keyboard, a mouse, or any combination thereof to provide data and communication inputs. Examples of the output device may include a display interface 414. The control unit 402 may operate the user interface 412 to present information generated by system 200. The control unit 402 may also execute the software 410 to present information generated by system 200, or to control other functional units of system 200. The display interface 414 may be any graphical user interface such as a display, a projector, a video screen, or any combination thereof.

The above detailed description and embodiments of the disclosed system 200 are not intended to be exhaustive or to limit the disclosed system 200 to the precise form disclosed above. While specific examples for system 200 are described above for illustrative purposes, various equivalent modifications are possible within the scope of the disclosed system 200, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 300 and system 200 are cost-effective, highly versatile, and accurate, and may be implemented by adapting components for ready, efficient, and economical manufacturing, application, and utilization. Another important aspect of embodiments of the present disclosure is that it valuably supports and services the historical trend of reducing costs, simplifying systems, and/or increasing performance.

These and other valuable aspects of the embodiments of the present disclosure consequently further the state of the technology to at least the next level. While the disclosed embodiments have been described as the best mode of implementing system 200, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the embodiments illustrated, but by the appended claims and their equivalents.

What is claimed is:

1. A computer implemented method for processing and verifying real-time calculations in a cloud computing environment, the method comprising:

receiving, by one or more computing devices and at a first data center, a request from a point of sale system to perform a real-time calculation, wherein the real-time calculation is used to make automated decisions about a transaction;

transmitting, by the one or more computing devices, the request to a decision handler housed in the first data center;
determining, by the decision handler, which of a plurality of decision engine queues coupled to the decision handler via application programming interfaces (APIs) to further transmit the request to;
transmitting, by the decision handler, the request to a decision engine queue from the plurality of decision engine queues;
determining, by the plurality of decision engine queues, which decision engines to scatter the request to by prioritizing the decision engines with excess compute resources;
scattering, by the decision engine queue, the request to at least two decision engines,
  wherein the at least two decision engines perform the real-time calculation in parallel, and
  wherein a first decision engine from the at least two decision engines is in the first data center and a second decision engine from the at least two decision engines is in a second data center geographically separate from the first data center;
receiving, by the decision engine queue, a result of the real-time calculation from a decision engine from the at least two decision engines;
transmitting, by the decision engine queue, the result to the decision handler; and
transmitting, by the decision handler, the result to the point of sale system.

2. The computer implemented method of claim 1, further comprising discarding, by the decision engine queue, subsequent results of the real-time calculation upon receipt of the result from the decision engine.

3. The computer implemented method of claim 1, wherein transmitting the result to the point of sale system is done within 250 milliseconds from when the request is received from the point of sale system.

4. The computer implemented method of claim 1, wherein scattering the request is performed based on a Scatter-Gather algorithm.

5. The computer implemented method of claim 1, further comprising determining, by the decision engine queue, a number of decision engines to scatter the request to based on predetermined rules.

6. The computer implemented method of claim 1, further comprising determining, by the decision engine queue, which data centers from a plurality of data centers to transmit the request to based on predetermined rules.

7. The computer implemented method of claim 1, wherein the at least two decision engines perform the real-time calculation using excess capacity compute resources of the at least two decision engines.

8. A non-transitory computer readable medium including instructions for processing and verifying real-time calculations in a cloud computing environment, wherein the instructions cause a computing system to perform operations comprising:
receiving at a first data center, a request from a point of sale system to perform a real-time calculation, wherein the real-time calculation is used to make automated decisions about a transaction;
transmitting the request to a decision handler housed in the first data center;
determining, by the decision handler, which of a plurality of decision engine queues coupled to the decision handler via application programming interfaces (APIs) to further transmit the request to;
transmitting, by the decision handler, the request to a decision engine queue from the plurality of decision engine queues;
determining, by the plurality of decision engine queues, which decision engines to scatter the request to by prioritizing the decision engines with excess compute resources;
scattering, by the decision engine queue, the request to at least two decision engines,
  wherein the at least two decision engines perform the real-time calculation in parallel, and
  wherein a first decision engine from the at least two decision engines is in the first data center and a second decision engine from the at least two decision engines is in a second data center geographically separate from the first data center;
receiving, by the decision engine queue, a result of the real-time calculation from a decision engine from the at least two decision engines;
transmitting, by the decision engine queue, the result to the decision handler; and
transmitting, by the decision handler, the result to the point of sale system.

9. The non-transitory computer readable medium of claim 8, wherein the operations further comprise discarding, by the decision engine queue, subsequent results of the real-time calculation upon receipt of the result from the decision engine.

10. The non-transitory computer readable medium of claim 8, wherein the operations comprise transmitting the result to the point of sale system is done within 250 milliseconds from when the request is received from the point of sale system.

11. A non-transitory computer readable medium of claim 8, with instructions wherein scattering the request is performed based on a Scatter-Gather algorithm.

12. The non-transitory computer readable medium of claim 8, wherein the operations further comprise determining, by the decision engine queue, a number of decision engines to scatter the request to based on predetermined rules.

13. The non-transitory computer readable medium of claim 8, wherein the operations further comprise determining, by the decision engine queue, which data centers from a plurality of data centers to transmit the request to based on predetermined rules.

14. The non-transitory computer readable medium of claim 8, wherein the operations further comprise the at least two decision engines to perform the real-time calculation using excess capacity compute resources of the at least two decision engines.

15. A computing system for processing and verifying real-time calculations in a cloud computing environment comprising:
a storage unit of the cloud computing environment to store instructions;
a communication unit of the cloud computing environment, coupled to the storage unit, configured to process the stored instructions to:
  receive a request from a point of sale system to perform a real-time calculation, wherein the real-time calculation is used to make automated decisions about a transaction, and
  transmit the request to a control unit of the cloud computing environment;

the control unit of the cloud computing environment, coupled to the storage unit, configured to process the stored instructions to:
  initiate a call to a decision handler housed in a first data center to determine which of a plurality of decision engine queues coupled to the decision handler via application programming interfaces (APIs) to further transmit the request to,
  the decision handler configured to process the stored instructions to transmit the request to a decision engine queue from the plurality of decision engine queues,
  the plurality of decision engine queues configured to process the stored instructions to determine which decision engines to scatter the request to by prioritizing the decision engines with excess compute resources,
  the decision engine queue configured to process the stored instructions to scatter the request to at least two decision engines to perform the real-time calculation in parallel, wherein a first decision engine from the at least two decision engines is in the first data center and a second decision engine from the at least two decision engines is in a second data center geographically separate from the first data center,
  the decision engine queue further configured to receive a result of the real-time calculation from a decision engine from the at least two decision engines,
  the decision engine queue further configured to transmit the result to the decision handler,
  the decision handler further configured to transmit the result to the communication unit; and
  wherein the communication unit is further configured to transmit the result to the point of sale system.

16. The computing system of claim 15, wherein the decision engine is further configured to discard subsequent results of the real-time calculation upon receipt of the result from the decision engine.

17. The computing system of claim 15, wherein the decision handler is further configured to transmit the result to the communication unit to further transmit the result to the point of sale system within 250 milliseconds from when the request is received by the communication unit from the point of sale system.

18. The computing system of claim 15, wherein the decision engine queue is further configured to scatter the request based on a Scatter-Gather algorithm.

19. The computing system of claim 15, wherein the decision engine queue is further configured to determine a number of decision engines to scatter the request to based on predetermined rules.

20. The computing system of claim 15, wherein the decision engine queue is further configured to determine which data centers from a plurality of data centers to transmit the request to based on predetermined rules.

* * * * *